United States Patent [19]

Nijhuis

[11] Patent Number: 4,468,837
[45] Date of Patent: Sep. 4, 1984

[54] APPARATUS FOR AUTOMATICALLY STUNNING ANIMALS TO BE SLAUGHTERED

[75] Inventor: Johan W. Nijhuis, Winterswijk, Netherlands

[73] Assignee: Machinefabriek G.J. Nijhuis B.V., Netherlands

[21] Appl. No.: 299,541

[22] Filed: Sep. 4, 1981

Related U.S. Application Data

[63] Continuation-in-part of Ser. No. 202,322, Oct. 30, 1980, abandoned, Ser. No. 161,298, Jun. 20, 1980, Pat. No. 4,353,147, Ser. No. 147,826, May 8, 1980, , Ser. No. 147,827, May 8, 1980, Pat. No. 4,338,700, Ser. No. 148,033, May 8, 1980, abandoned, and Ser. No. 148,034, May 8, 1980, Pat. No. 4,319,383, said Ser. No. 202,322, is a continuation of Ser. No. 905,371, May 12, 1978, abandoned.

[30] Foreign Application Priority Data

| | | | |
|---|---|---|---|
| May 18, 1977 | [NL] | Netherlands | 7905519 |
| May 10, 1979 | [NL] | Netherlands | 7903678 |
| May 10, 1979 | [NL] | Netherlands | 7903681 |
| May 10, 1979 | [NL] | Netherlands | 7903677 |
| May 10, 1979 | [NL] | Netherlands | 7903680 |
| Jun. 25, 1979 | [NL] | Netherlands | 7904935 |

[51] Int. Cl.³ ............................................. A22B 3/06
[52] U.S. Cl. ...................................... 17/1 E; 17/1 A
[58] Field of Search ............................. 17/1 E, 1 A

[56] References Cited

U.S. PATENT DOCUMENTS

| | | | |
|---|---|---|---|
| 1,857,658 | 5/1932 | Pfretzschner | 17/1 A |
| 3,177,526 | 4/1965 | Braun | 17/1 E X |
| 3,314,103 | 4/1967 | Rains | 17/1 E X |
| 3,657,767 | 4/1972 | Schmidt, Jr. | 17/1 A |

FOREIGN PATENT DOCUMENTS

| | | | |
|---|---|---|---|
| 216412 | 7/1958 | Australia | 17/1 A |
| 696874 | 10/1964 | Canada | 17/1 A |

*Primary Examiner*—Willie G. Abercrombie
*Attorney, Agent, or Firm*—Arnold, White & Durkee

[57] ABSTRACT

Apparatus is provided for automatically electrically stunning animals to be slaughtered. The apparatus includes two V-shaped restrainers, where the second restrainer runs faster than the first restrainer to automatically space the animals apart. A pair of electrodes which are adapted to extend downwardly into the second V-shaped restrainer, are disclosed. The electrodes are specially shaped and are preferably adapted to transversely engage the head of the animal to be stunned. The electrodes are pivotally suspended from a reciprocating frame which is provided to move with the restrainer carrying an animal during the period that stunning is taking place, in order to maintain contact between the animal and the electrodes during the period of stunning.

15 Claims, 16 Drawing Figures

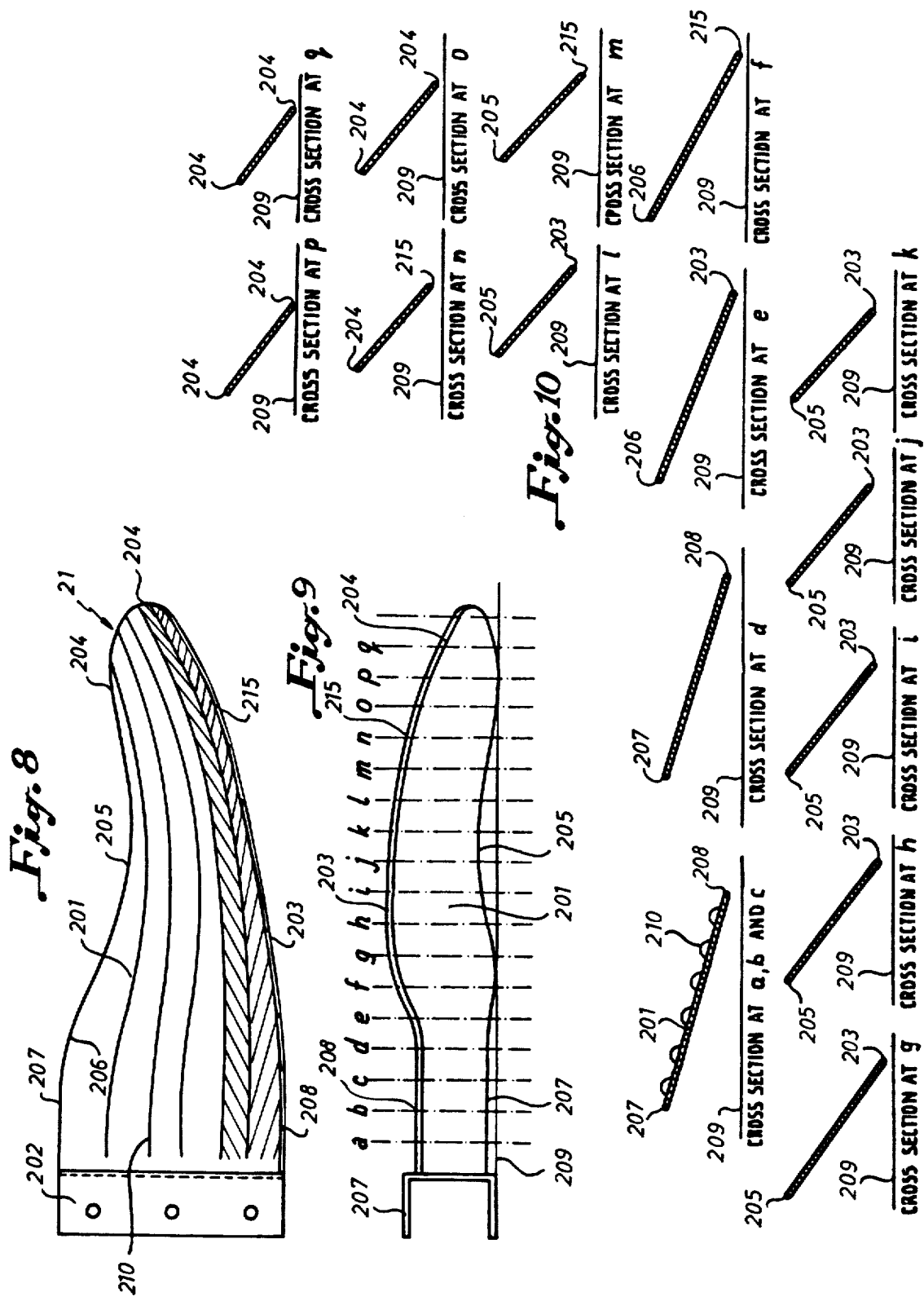

APPARATUS FOR AUTOMATICALLY STUNNING ANIMALS TO BE SLAUGHTERED

CROSS REFERENCE TO RELATED APPLICATIONS

This application is a continuation-in-part of application Ser. No. 202,322, filed Oct. 30, 1980, now abandoned, which is a continuation of application Ser. No. 905,371, filed May 12, 1978, now abandoned; this application is also a continuation-in-part of application Ser. No. 161,298, filed June 20, 1980, now U.S. Pat. No. 4,353,147, application Ser. No. 147,826, filed May 8, 1980, application Ser. No. 147,827, filed May 8, 1980, now U.S. Pat. No. 4,338,700, application Ser. No. 148,033, filed May 8, 1980, now abandoned, application Ser. No. 148,034, filed May 8, 1980, now U.S. Pat. No. 4,319,383.

BACKGROUND OF THE INVENTION

The invention relates generally to apparatus for electrically stunning animals to be slaughtered, such as pigs, sheep, cattle, and other animals which are slaughtered to produce meat usually for human consumption.

Before animals such as pigs are slaughtered, they should be rendered unconscious, or stunned. Stunning the animals before slaughtering helps to prevent unnecessary animal suffering. Such stunning is desirably accomplished by applying an electrical shock to the animal. To render the animal unconscious, it is desirable to pass sufficient electrical current through the animal's brain to result in a generalized epileptic insult. In the past, the electrical shock has been induced by manually applying electrodes to the animal. There has been a need in the art for an apparatus that can effectively stun animals automatically without requiring manual placement of the electrodes.

In the past, manual methods have included utilization of a pair of electrical contacts, or stunning rods, which are held by a human operator against the head of an animal so that electrical current flows from one electrical contact through the animal and to the other electrical contact. The stunning rods may be applied in a longitudinal direction, relative to the animal's body, or in a direction transverse thereto.

Manual stunning techniques have been plagued with problems, such as, the improper application of electrodes to the animal, insufficient current flow to effectively render the animal unconscious, the failure to immediately evoke unconsciousness, the failure to prevent unnecessary animal suffering, and the failure to adequately protect the safety of stunning equipment operators.

70 volts is a commonly used voltage for manual stunning methods. If a human equipment operator is to handle the electrodes used for stunning, it is desirable to keep the voltage as low as possible to minimize the danger of electrocution to which the operator is exposed. In practice, it has been found that while 70 volts may immobilize a pig's neuromotor functions, electroencephalographic traces showing the pig's brain activity have revealed that a pig remains conscious after being stunned with only 70 volts. Such insufficient stunning is cruel and causes unnecessary animal suffering.

In pigs, it has been found that the current level generally necessary to achieve an immediate effective stunning in at least 90% of the pigs tested was 1.07 ampheres. In practice, it has been found that 70 volt equipment fails to produce current levels of 1.07 ampheres in a pig. Increasing the voltage to a more dangerous level of 180 volts will sometimes produce a current level greater than or equal to 1.07 ampheres, and sometimes will not produce the necessary current level.

The current flow required for stunning should pass directly through the head of the animal at the correct potential and the correct intensity. It must pass through the head so that current will flow through the animal's brain, instead of through the animal's muscle tissue. It must be at the correct potential and intensity to insure that the animal is rendered unconscious, not just merely immobilized.

Voltage levels as high as 300 volts and 525 volts have been used in the past. However, the use of such voltage levels creates problems. As the voltage is increased, the danger to human equipment operators is increased. It is undesirable to force a man to handle electrodes with such high voltages present on the electrodes.

Also, when the voltage level is as high as 300 volts or 525 volts, if the electrodes are applied to the animal so that significant current flows through the animal's muscles instead of its brain, severe muscle contractions can be induced in the animal. The muscle contractions can be so severe that bone breakage and internal bleeding can occur.

Such severe muscle contractions cause unnecessary animal suffering. In addition, improper current flow during stunning should be avoided because it can result in reducing the value of the meat of the animal to be slaughtered. When muscular contractions occur in the animal, causing bone breakage and internal bleeding, the meat of the animal must usually then be classified as a lower quality or grade of meat.

High voltage current flowing through muscle tissue causes adverse consequences including unfavorable post-mortem chemistry in the animal meat. Such current flow through muscle tissue is believed to result in the release of lactic acid in the meat tissue because of the severe muscle contractions. The lactic acid accumulation may have an unfavorable effect on the quality of the meat and can result in a condition commonly referred to in the art as pale-soft-exudative, of P.S.E. The meat will have a poor color and appearance.

As the voltage level is increased the placement of the electrodes becomes more critical in order to avoid high voltage current flow through the animal's muscle tissue. Manual stunning methods have an element of uncertainty due to the manual application of the electrodes.

At low production rates, manual stunning techniques may result in a low percentage of animals that are not of prime quality due to internal bleeding and bone breakage caused by the improper application of electrodes. Manual stunning presents, however, the drawback of limited production, because human operators in practice have not generally been capable of production rates above a certain level of production without adverse effects on efficiency. Attempts to increase the production rate can result in a significant increase in the incidence of misapplication of the electrodes to animals. Furthermore, to avoid the situation where the animal to be stunned only loses consciousness momentarily, it is desirable to use a high voltage which is believed to adversely affect the human operator's safety.

For example, if a production rate of 600 pigs an hour were to be attempted, the human operator would have to stun an animal every six seconds. This would create a great deal of stress upon a human operator, who must handle high voltage electrodes and quickly apply them to each animal's head while the animal may be squirming or trying to avoid the electrodes. In practice, it has been found that the number of times that a human operator will improperly apply the electrodes, inducing convulsions and resulting in low grade meat, increases substantially at such attempted production levels. In other words, a higher drop out percentage results.

In the past, attempts to develop an automatic stunning apparatus resulted in a higher drop out percentage than that occurring from manual stunning even at slow production rates. That is, a greater percentage of lower quality grade meat was obtained from animals subjected to such attempts at automatic stunning as compared to manual stunning. There has been a long felt need in the art for an effective automatic stunning apparatus.

U.S. Pat. No. 1,857,658, issued to Pfretzschner, represents an attempt at an automatic stunning device. The flaps illustrated for use as electrodes are intended to roll over the back or sides of the animal to be stunned. Such a haphazard placement of electrodes would likely result in violent convulsions and broken bones, with the resultant adverse effects on meat quality.

It is important that animals be restrained during stunning so that the animals are not touching each other. If one animal is touching another animal that is being stunned, that animal will also receive a shock. Typically, the shock flows through muscle tissues and can cause convulsions, creating the adverse consequences that result from such convulsions, including broken bones, internal bleeding, poor meat quality, and unnecessary animal suffering. The previously mentioned Pfretzschner reference does not recognize this problem.

The present invention is believed to provide an automatic apparatus for electrically stunning animals in which the drop out percentage is equal to or less than that achieved with manual stunning techniques. The present invention is believed to provide an automatic apparatus capable of achieving production rates faster than are practicable with manual stunning.

SUMMARY OF THE INVENTION

In accordance with the present invention, there is provided an apparatus for automatically electrically stunning animals, which includes a first conveyor having two synchronously and parallel running endless conveying belts, the operating surfaces of which are positioned to form a substantially V-shaped passageway therebetween. A floor is disposed beneath the conveying belts in such a manner that the distance between the floor and the belts generally increases in the direction of movement of the belts. In other words, as animals move down the V-shaped belts, the sloping floor drops out from under their feet leaving them held solely by the V-shaped belts.

The preferred embodiment of the apparatus further includes a pair of electrodes which are arranged side by side in the passageway and which are of such a shape and have been mounted in such a manner that they are operative to engage the sides of the head of the animal substantially at the same time. In a preferred embodiment, the electrodes are positioned side-by-side rather than consecutively so that the electrical current will pass transversely through the brain of the animals to be stunned.

In the presently preferred embodiment, the two electrodes comprise two plates, the outer portions of which are substantially parallel to each other and are disposed adjacent to the respective operating surfaces of the conveying belts. The portions of the electrodes which face each other diverge from the lower ends thereof in an upward direction up to about half the height of said plates whereupon by means of a curvature said latter edges merge into a converging portion. In other words, the electrodes are shaped to conform to the contour of the head of an animal.

Alternatively, the pair of electrodes may be disposed consecutively and oriented so that the distance between the electrodes remains substantially constant as an animal contacts the electrodes. In this latter embodiment, each electrode includes a plurality of parallel rods spanning the transverse distance between the conveying belts.

In one aspect of the present invention, the electrodes are pivotally suspended from a reciprocating frame. When the electrodes simultaneously contact the animal's head, the reciprocating frame begins to move in the same direction as the conveying belts at a velocity substantially equal to that of the belts. This maintains the electrodes in contact with the head of the animal as the animal is moved by the conveying belts. At fast production rates, this keeps the electrodes in contact with the head of the animal longer to improve the effectiveness of the stun.

In another aspect of the present invention, a second V-shaped conveyor is provided after the first conveyor. The second conveyor is operated at a faster velocity than the first conveyor to ensure that adjacent animals are spaced apart as they are transported by the second conveyor into contact with the electrodes. This prevents a second animal from receiving a shock by being in contact with a first animal that is being stunned.

These and other features and advantages of the present invention will hereinafter appear, and for purposes of illustration but not of limitation, an exemplary embodiment of the present invention is shown in the appended drawings and described in the following detailed description.

BRIEF DESCRIPTION OF THE DRAWINGS

FIG. 8 illustrates a presently preferred embodiment of an electrode in rear view.

FIG. 9 is a side view of the electrode of FIG. 8.

FIG. 10 shows seventeen different cross-sections of FIG. 9, illustrating the slope and contour of the electrode.

DESCRIPTION OF A PRESENTLY PREFERRED EMBODIMENT

Figure 3:
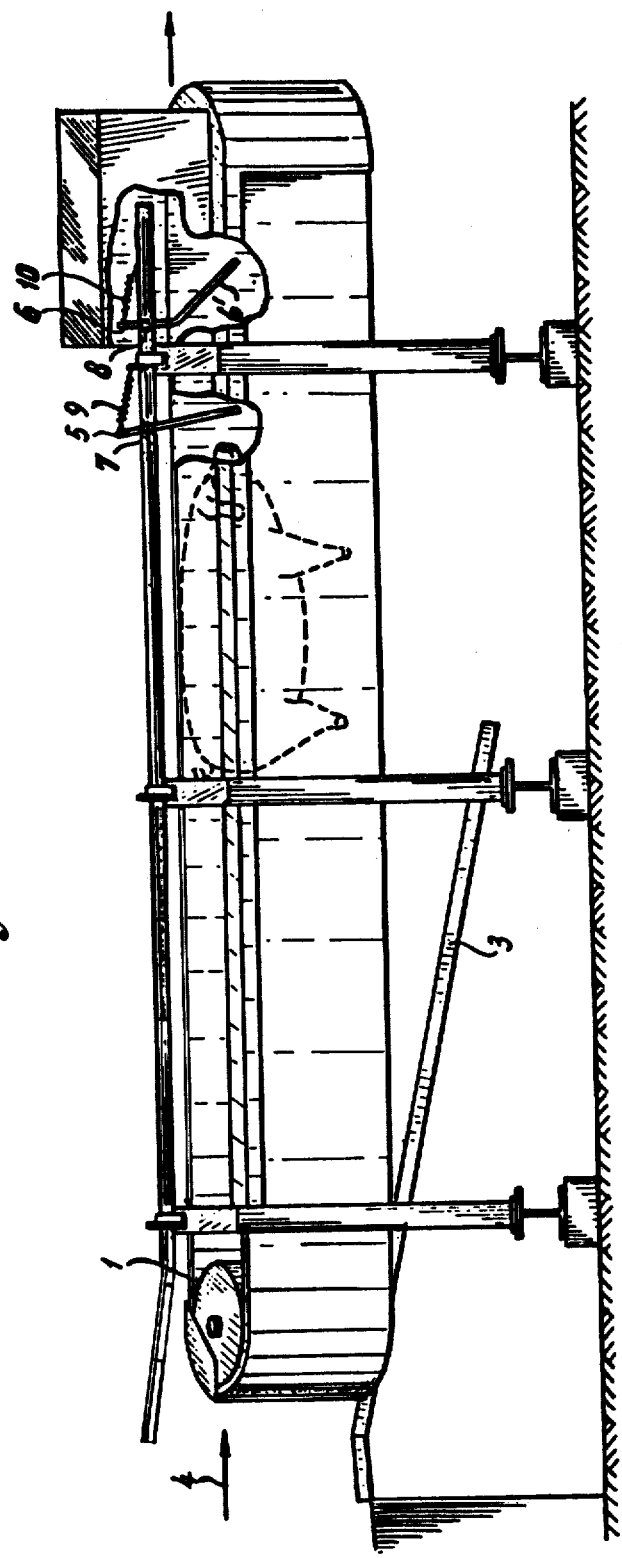
FIG. 3 illustrates a side view of an embodiment of the invention, shown partially in cross section.
Figure 4:
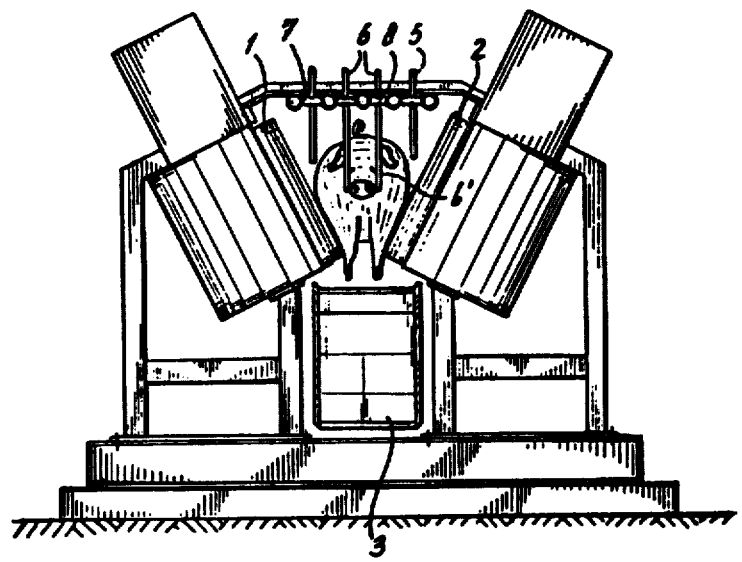
FIG. 4 depicts an end view of the embodiment of FIG. 3, showing an animal held in the V-shaped conveyor belts.

FIG. 3 illustrates a V-shaped conveyor belt 1, and shows how animals are herded toward the V-shaped belt 1 from the left (shown a 4 in FIG. 3). A floor 3 is provided sloping downwardly so that as an animal is moved in the direction indicated as 4 in FIG. 3, the floor 3 drops away from its feet until the animal is supported only by the V-shaped belt 1 and is moved into contact with a set of electrodes 5 and 6. FIG. 4 shows how the animal is supported by the V-shaped belt 1 as it is moved toward the electrodes 5 and 6. Thus the animal is effectively restrained and automatically carried into contact with a set of electrodes.

It is desirable to provide means for preventing animals from touching each other when one of the animals is brought into contact with the electrodes. If one animal is touching another animal being stunned, that animal will also receive a shock that could cause convulsions, bone breakage, internal bleeding, and unnecessary animal suffering. Thus, means should be provided to provide for the automatic spacing of the animals. This is essentially accomplished in the present invention by providing two sets of conveyor belts, as shown in FIG. 1 and in FIG. 5.

Figure 1:
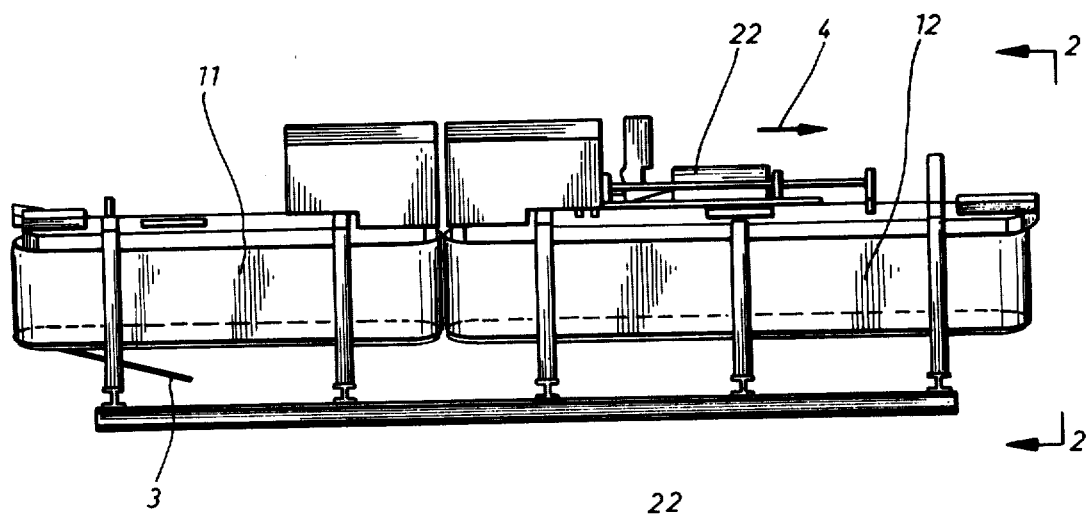
FIG. 1 illustrates a side view of a preferred embodiment of the invention.

In the presently preferred embodiment illustrated in FIG. 1, the velocity of the first restrainer 11 is lower than that of the second restrainer 12. In other words, the second restrainer 12 operates at a faster rate than the first restrainer 11 to ensure that the animals on the second restrainer 12 are spaced apart. This arrangement provides for the automatic separation of animals to facilitate the stunning of one animal without the application of a shock to the next-succeeding animal, which might otherwise be touching the animal that is being stunned. The automatic separation of the animals is further illustrated in connection with FIG. 3.

A brief description of the operation of the apparatus is as follows: Referring to FIG. 1, the animals are introduced in succession into the automatic stunning apparatus from the left. The animals each in turn are carried toward the right by the first restrainer 11. The floor 3 drops out from under the animals, leaving them held only by the restrainer 11. The first restrainer 11 carries the animals to the second restrainer 12, which runs faster than the first restrainer 11. The animals are automatically spaced apart on the second restrainer 12 and are carried into contact with electrodes 20 and 21, visible in FIG. 2.

When an animal contacts the electrodes 20 and 21, a sensing current begins to flow to automatically test whether the appropriate contact has been made with the animal's head. The electrodes 20 and 21 are preferably pivotally attached to a movable frame assembly 22. When an animal contacts the electrodes 20 and 21, the frame assembly 22 begins to move along with the animal in the direction of conveyance (shown as 4 in FIG. 1) in order to maintain a longer contact between the electrodes 20 and 21, and the animal. If the automatic test performed by the apparatus with the sensing current indicates that the appropriate contact has been made, the full stunning current will be switched in and the animal will be electrically stunned to render the animal unconscious.

The animals are released one by one from the second restrainer 12 in an unconscious state. The animals may be hung upside-down by their hind legs and bled. If the animals have been correctly stunned, the animals' brain activity will cease due to loss of blood before the animals regain consciousness, thus preventing unnecessary suffering by the animals. The animals may then be processed for slaughtering in a conventional manner.

Figure 6:
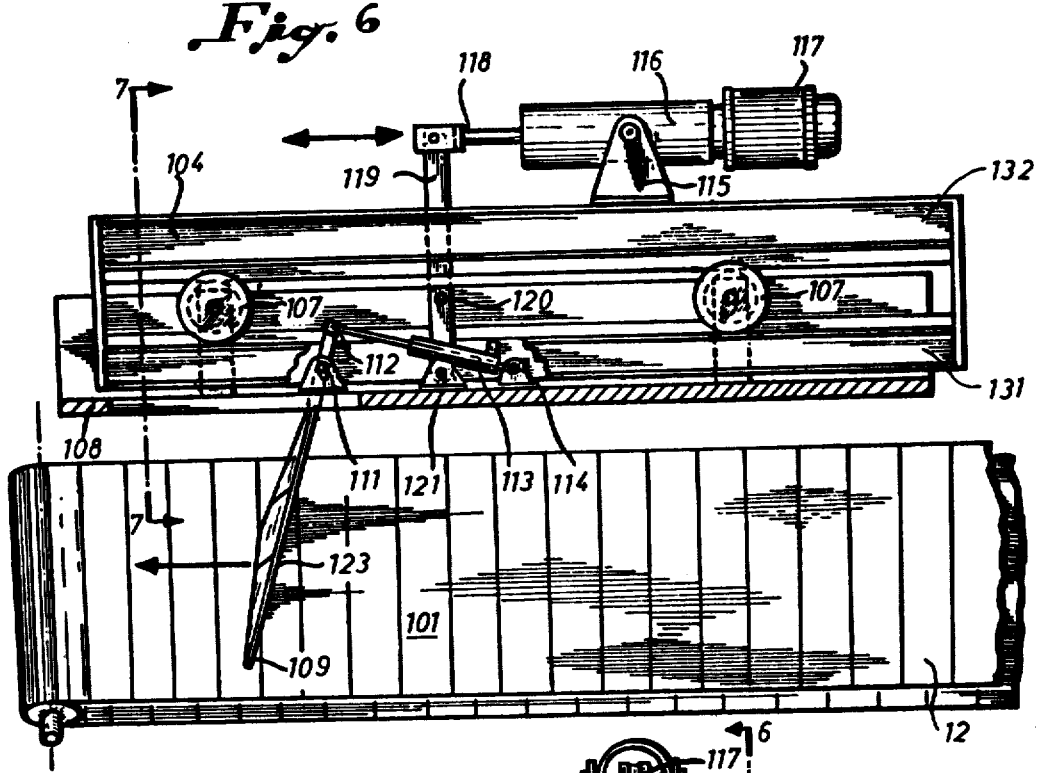
FIG. 6 is a partial side-elevational view, partially in cross section, of an apparatus for electrically stunning animals in accordance with a presently preferred embodiment.
Figure 7:
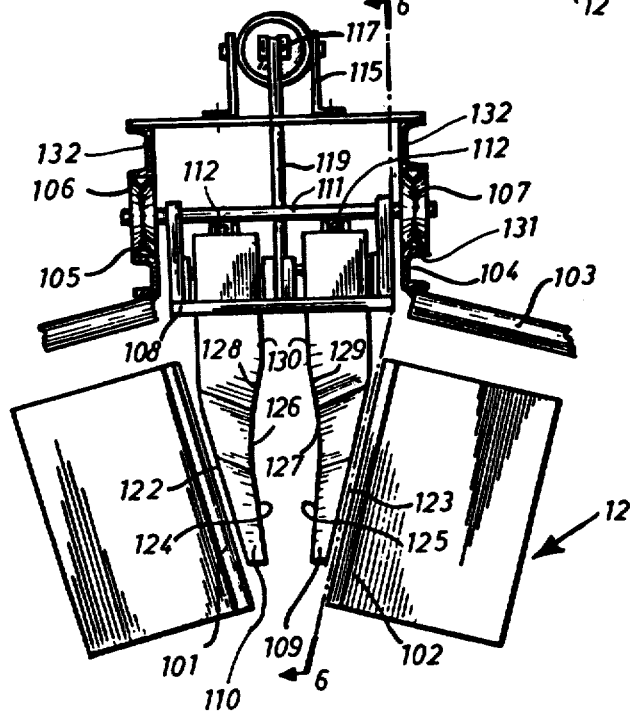
FIG. 7 is a sectional view of the apparatus of FIG. 6 taken along section line 7—7 in FIG. 6.

The construction and operation of the apparatus will be better understood by the detailed description that follows:

A set of electrodes are provided in cooperative association with the second restrainer 12. One embodiment of suitable electrodes is illustrated in FIGS. 6-7. A second embodiment of suitable electrodes is shown in FIGS. 8-10, and in FIG. 2.

FIG. 7 shows an end view of the second restrainer 12 having electrodes 109 and 110 extending downwardly into the V-shaped passageway so that the electrodes 109 and 110 will contact an animal held between two conveying belts 101 and 102. The electrodes 109 and 110 are arranged side-by-side and are intended to contact the animal at substantially the same time.

The electrodes 109 and 110 shown in FIG. 7 have horizontal under edges 134 and 135, respectively. The electrodes 109 and 110 have outer side edges 122 and 123 respectively running substantially parallel to the surfaces of the conveyor belts 101 and 102, respectively. This shape minimizes the chances of an animal putting its head into the gap between one electrode and the conveyor.

One problem with automatic stunning is that, while it is possible to restrain an animal's body with the V-shaped restrainer 12, it is not practical to restrain the animal's head. Without a human operator to orient the placement of the stunning electrodes to accommodate various possible positions of the animal's head, in an automatic stunning apparatus it is desirable to induce the animal to place its head in the appropriate position between the electrodes.

In the embodiment of the electrodes 109 and 110 illustrated in FIG. 7, the electrodes have inner edges facing each other, the inner edges including diverging lower portions 124 and 125 merging by means of a curvature 126 and 127 into converging portions 128 and 129, respectively. The converging portions 128 and 129 merge finally into parallel edge portions 130. It has been found in practice that the animal will seek to put its head through the space between the two electrodes, whereby the animal's snout will seek more or less unintentionally the appropriate position with respect to the electrodes 109 and 110 so that the electrodes 109 and 110 will pass across the sides of the snout and head.

In horizontal cross-section, each one of the electrodes 109 and 110 is curved, the strongest curvature being present at the level of the portion 126 or 127 respectively. This curvature is such that, when viewed in the direction of conveyance, the edges 126 and 127 will be present in front of the edges 122 and 123, respectively, and will preferably form part of an arc. In the lower portion and in the upper portion, that is to say the portions having diverging edges 124 and 125, and converging edges 128 and 129, respectively, this curvature may be less pronounced.

It is conceivable that one may use an embodiment in which, when viewed from below, the lower portions of the electrodes 109 and 110 constitute flat planes positioned to form together a V-shaped border line, where the planes form this V-shape either through a change of angle with the upper portions of the electrodes 109 and 110, or by merging into a curvature.

In practice, the embodiment of the electrodes illustrated in FIGS. 6 and 7 may sometimes leave traces on the skin of some types of animals. This may be undesirable.

Figure 2:
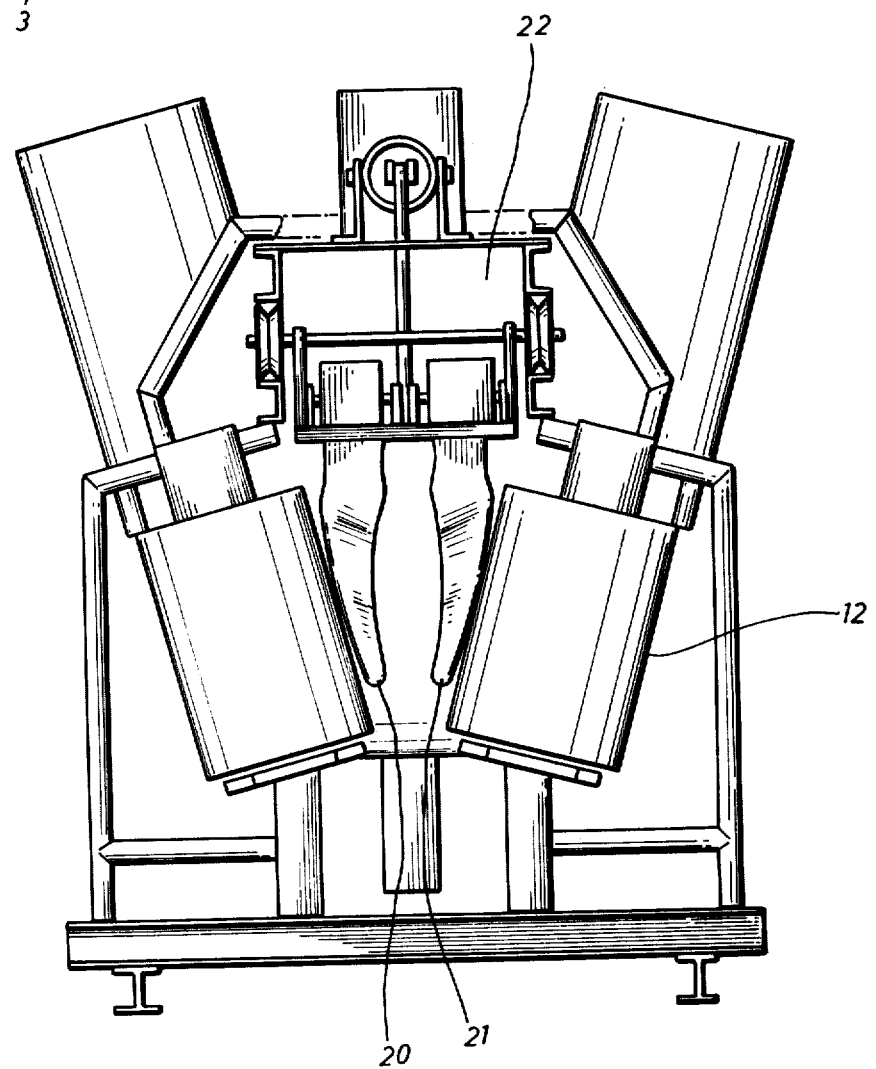
FIG. 2 illustrates an end view of the preferred embodiment shown in FIG. 1.

A presently preferred embodiment of suitable electrodes is illustrated in FIGS. 8–10, and in FIG. 2. This embodiment of the electrodes minimizes the possibility of leaving traces upon the animal's skin, while at the same time achieving sufficient contact with the animal to effectuate stunning.

In a preferred embodiment, two electrodes are fashioned as mirror images of each other as illustrated in FIG. 2 and in FIGS. 8–10. The two electrodes are placed side-by-side on the second restrainer 12 (see FIGS. 1 and 2), generally in parallel relationship to each other. The electrodes are mounted so that they are pivotable around a generally horizontal transverse axis lying above the restrainer 12. The axis of rotation lies in the center of a U-shaped portion 202 shown in FIG. 9.

Figure 11:
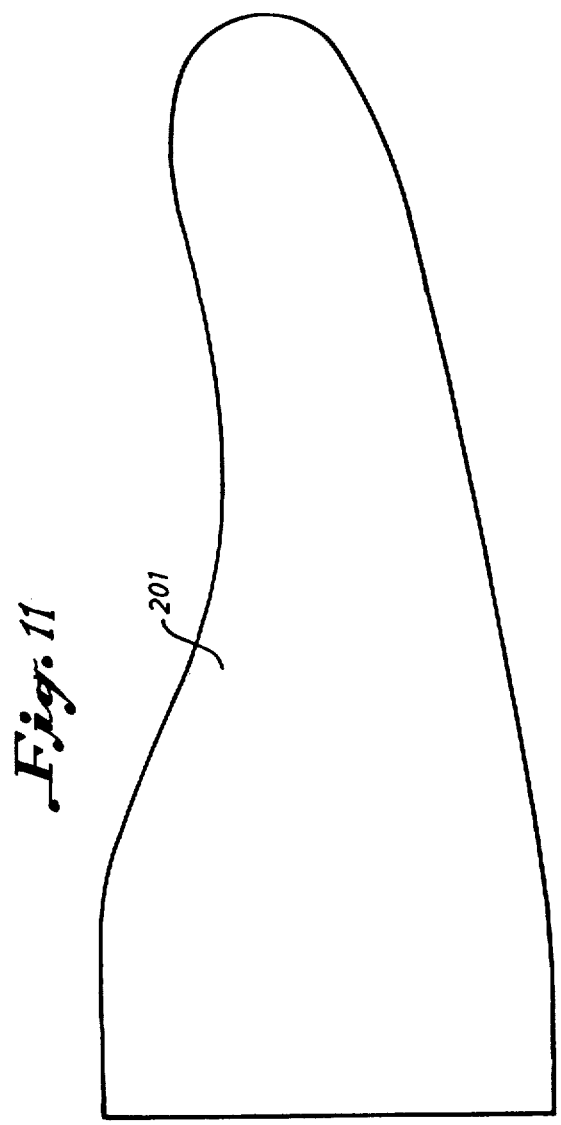
FIG. 11 illustrates a flat development of a plate from which the presently preferred embodiment of the electrode illustrated in FIGS. 8-10 can be made.

Each electrode may be fashiond from a flat plate 201 of the shape illustrated in FIG. 11. The flat plate 201 is provided with rounded off under edges, as shown in FIGS. 8 and 9. The U-shaped portion 202 is welded to the plate 201, and is fixed on a pivot shaft so that the electrode may pivot about the axis of rotation. The rounded off under edges curve smoothly into an outer edge 203 on the diverging portion. The outer edge 203 of the plate 201 is nearly rectilinear over the greatest part of its length, having a straight portion 208, but merges smoothly into the curved point 204 in the final third portion through a curvature 215 having a very weak bending or small amount of curvature initially. The curved point 204 merges smoothly into the curvature or converging edge portion 205 leading smoothly to a reverse bending 206 merging smoothly into a straight portion 207 located opposite of the straight portion 208 of the outer edge 203.

Rouding off the under edges of the electrodes minimizes the chances of the electrodes leaving traces on the back portion of the animal. The smoothly curved edges of the plate electrodes directed slantingly frontward are designed to provide good electrical contact with the head of the animal without leaving traces, even though the head of each animal may be in a different position and each animal's head may contact one electrode earlier than the other electrode.

The outer edges of each electrode extend substantially parallel to and in closed relationship along the operating surfaces of the conveyor belts 101 and 102 to keep the animal from placing its head between an electrode and a conveyor belt. The edges of the electrode which are facing each other diverge in an upward direction from the under ends and merge through a curvature into edges converging to each other. The electrodes when viewed in the direction of conveyance are seen as being directed slantingly downward and frontward from above such that the inner edges with respect to the outer edges are directed frontward from beneath and subsequently run back again so that in the center portion viewed from above a V-shaped position (in the direction of advance) of the operating surfaces of the electrodes is obtained.

This may be better understood with reference to the cross section of FIG. 9 taken along line h, which is illustrated in FIG. 10. The electrode, at the cross section taken along line h, forms an angle of roughly 45° with a reference plane 209. The reference plate 209 is vertical and is transverse to the direction of advance of the animal. Because the two electrodes are generally mirror images of each other, the other electrode will also form an angle of roughly 45° at the corresponding cross section. Thus, the two electrodes will, when viewed from above, form a V-shaped position at this cross section of the operating surfaces.

If the preferred embodiment of the electrodes are oriented vertically, each electrode will be seen to be rectilinear in each cross section taken in a horizontal plane parallel to the electrode's pivot axis. This can be seen with reference to the cross sections illustrated in FIG. 10. Each rectilinear section with respect to the vertical reference plane 209, which is parallel to the pivot axis, makes an angle with the reference plane 209. This angle when viewed from above over approximately a third of the length of each electrode increases from a small angle up to an angle of approximately 45°, over the center range. The center range is the range with the curvature of the inner edge lying between the diverging and the converging portion of the electrodes. In the center range of the electrodes, the angle remains nearly equal, and thereafter decreases slightly again. The distance of the outer edge 203 of each electrode from the reference plane 209 remains at first substantially equal in the first one third part 208 of the length 203 of the electrode, decreases slightly thereafter, and then increases in the center range; this distance again decreases in the final portion 215 of the electrode.

So, over the entire height the electrodes form a generally V-shaped passage in the direction of conveyance, which is wide open in the upper portion, becomes slightly narrower subsequently, and thereafter opens slightly again. Each electrode by its alternating distance of the outer edge from the reference plane 209 exhibits also a slight curvature directed frontward if viewed along the electrode from above.

The opening formed between the two electrodes by the curvature of the inner edge when the electrodes are in a condition of rest is an aperture that is slightly lens-shaped. The opening is similar to the shape that would be formed by two big thumb free hands when the hands naturally gripped around the snout of an animal from above, with one hand on one side of the snout and one hand on the other side of the snout.

In FIG. 10 the cross sections of the electrode are shown with respect to the reference plane 209.

In the first cross sections a, b, c and d, the distances of the outer edge 208 from the reference plane 209 are equal. Similarly, the distance of the inner edge 207 from the reference surface 209 is equal for these cross sections. In the cross section e, the outer edge 203 becomes slightly closer to the reference plane 209, and this continues up to the cross section g. The inner edge 206 has a larger distance from the reference plane 209 in cross sections e and f. The distance of the curvature 205 from the reference plane 209 as shown in the cross sections g, h and i remains nearly equal over these cross sections. However, at the same time the distance of the outer edge 203 from the reference plane 209 becomes larger, which continues up to the cross section k. After cross section k, the distance from the inner edge 205 and 204 to the reference plane 209 decreases again. Also, after cross section k the distance between the outer edge 203, 215 and 204 to the reference plane 209 decreases again.

The different sections a up to and including q show clearly the trend of the angle of inclination and the variation of the distance from the reference plane 209 and give in this way in combination with FIGS. 8 and 9 a picture of the three-dimensional profile of the electrodes.

The surface of the electrodes which comes into contact with the animal can be provided with ridges 210 or similar raisings, as shown in the cross sections a, b and c illustrated in FIG. 10. Such ridges 210 are intended to increase the contact pressure of the electrodes onto the animal. Increasing the contact pressure improves the passage of current, which may permit the stunning voltage to be lowered without adversely affecting the effectiveness of the apparatus. The ridges 210 preferably extend in the direction in which the animal's head brushes past the electrode, as illustrated in FIG. 8. However, the ridges 210 may extend in other directions without departing from the invention.

Although the electrodes have been described as preferably being fashioned from flat plates 201, the electrodes may be manufactured by molding or by casting, all as will be apparent to those skilled in the art after having the benefit of this disclosure. The ridges 210 may be formed upon the electrodes during casting. In manufacturing the electrodes from plates 201, the ridges 210 may be formed from weld beads, which may be ground or not, as desired.

An animal passing between the two electrodes will at some point contact both electrodes. When the animal does so, a sensing current of low voltage will start to flow. This sensing current will be tested to determine whether the proper resistance is presented between the two electrodes. By testing the sensing current, it is possible to tell whether the animal contacting the electrodes is a pig or not. Every kind of animal presents its own specific resistance to the sensing current flow. Thus, each kind of animal will allow a different level of sensing current to flow. If the sensing current is found to be at the appropriate level, so that the apparatus is able to automatically determine both that the right kind of animal is present between the electrodes and that the electrodes are engaging the head of the animal in the proper way, then the main current will be automatically switched in and stunning will occur. This eliminates the need for human observation and decision.

At high production rates, the animals will be moved quickly through the apparatus. It is desirable to move the electrodes along with the head of the animal in order to lengthen the amount of time that the electrodes are in contact with the head of the animal. This is essentially accomplished in the present instance with the apparatus illustrated in FIGS. 1, 2, 6 and 7.

Referring to FIG. 7, on top of frame 103 of the apparatus, which is only indicated schematically, is affixed frame 104. The frame 104 includes lower and upper members 131 and 132 respectively having U-shaped cross sections, the flanges of which face each other. The flanges of the U-shaped members 131 and 132 are provided with V-shaped rail surfaces 105 and 106. Between the rail surfaces 105 and 106 are accommodated runners 107. The guide surfaces 105 and 106 may be coated with a teflon layer or the like to reduce noise caused by the travel of the runners 107 over the guide surfaces 105 and 106.

The two electrodes 109 and 110 are suspended from frame 108 and extend downwardly into the V-shaped passageway. Electrodes 109 and 110 are pivotally mounted on a shaft 111 and are each hingedly coupled to a dampening member 113 (FIG. 8) by rod 112.

The dampening members 113 dampen at least the upward movement of electrodes 109 and 110, and the counteracting resistance of the dampeners helps maintain good contact between the electrodes 109 and 110 and the moving head of the animal. Upon passage of the stunned animal, the dampeners 113 cause the electrodes 109 and 110 to return to their initial position, thus permitting the time between stunning of successive animals to be kept small in order to achieve a sufficiently fast production rate. It is to be understood that a single dampening member 113 may be provided for simultaneously dampening the movement of the two electrodes 109 and 110 and still remain within the contemplation of the present invention.

The dampening members 113 are hingedly fastened to the frame 108 at 114. In a way not shown but known to those skilled in the art, the electrodes 109 and 110 are insulated with respect to each other on the shaft 111 as well as with respect to the frame 108 and are connected to suitable current conductors.

Mounted on frame 104 are supports 115 which support driving means 116, such as a hydraulic cylinder, and a motor-driven pump 117 coupled thereto. A piston rod 118 of the cylinder 116 is coupled through a lever 119 to the frame 104 and to the frame 108 at 120 and at 121, respectively. A movement of the piston rod 118 in a direction opposite to the direction of movement of the conveying belts causes movement of the frame 108 together with the electrodes 109 and 110 in the direction of conveyance of the animal.

When a flow of current occurs between the electrodes 109 and 110, or after some predetermined time delay, a normal switching circuit (not shown) switches on drive motor 117, whereby hydraulic cylinder 116 extends piston rod 118 at a velocity causing frame 108 to move at a velocity substantially equal to that of conveying belts 101 and 102. Thus, the reciprocating frame 108 enables the electrodes 109 and 110 to maintain proper contact with the head of the animal during the period of stunning.

The reversal of the motor 117 and the cylinder 116, and the frame 108 may be controlled by a time switch or by a limit switch mounted on a stop disposed at a predetermined distance downstream from the initial position of frame 108.

At a desired production level of 600 pigs per hour, for example, six seconds are allocated for stunning an animal. One to four seconds are required for actual stunning, leaving a sufficient amount of time for the return movement of frame 108. The reciprocating movement of the frame 108 lengthens the amount of time that the electrodes are in contact with the head of the animal, so that one to four seconds of contact time may be provided even at fast production rates.

Those skilled in the art should appreciate that other electrode arrangements like that illustrated in FIGS. 3, 4, 5, 12 and 13, such as a consecutive arrangement, may be used with the reciprocating frame 108 and still remain within the contemplation of the present invention.

In one such alternate embodiment, when viewed from below, the lower portions of the electrodes may constitute flat members positioned to form a V-shaped configuration, either maintaining said V-shape though at a change of the angle or merging into a curvature.

Figure 12:
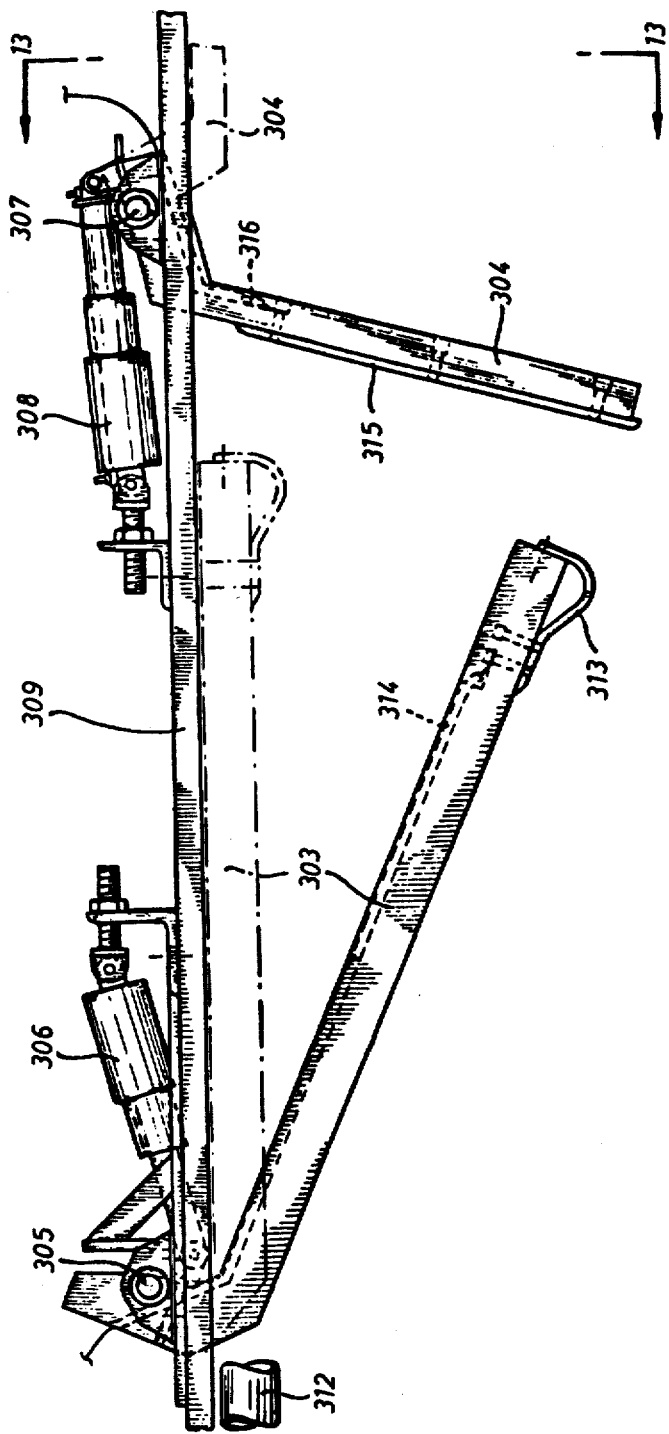
FIG. 12 is a side-elevational view of an alternate embodiment of an electrode arrangement.
Figure 13:
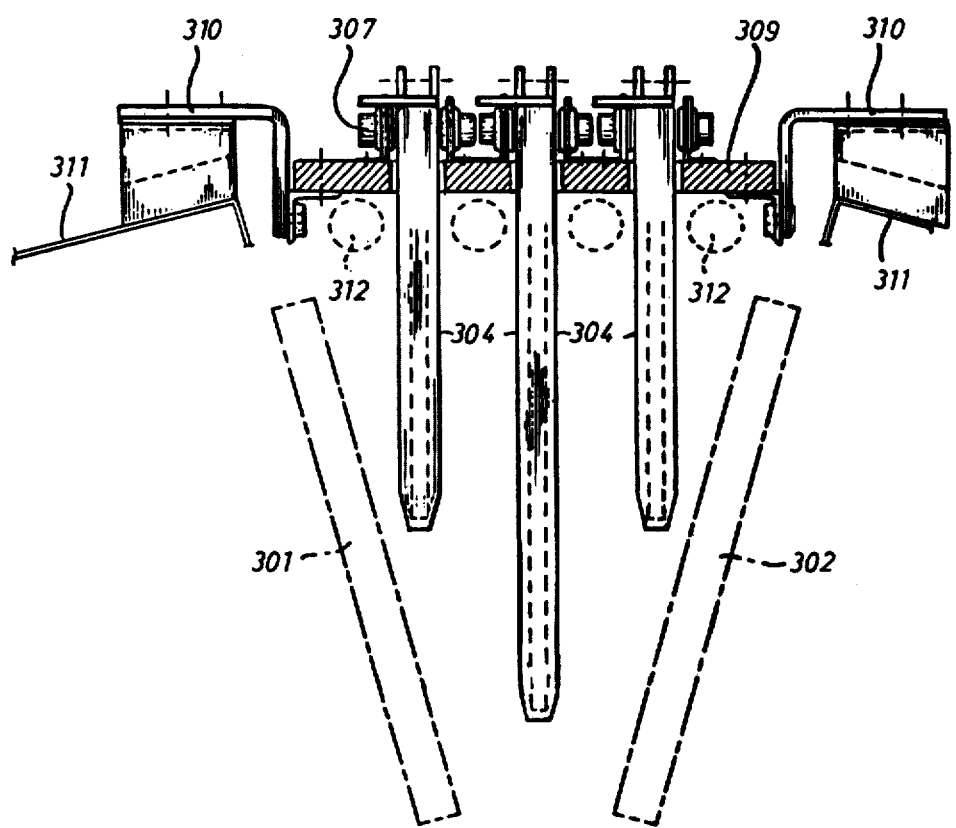
FIG. 13 is a sectional view of the alternate electrode arrangement taken along section line 13—13 in FIG. 12.

In still another alternate embodiment, the electrodes may be arranged consecutively as shown in FIG. 12, and each electrode may comprise a plurality of parallel rods which are pivotally suspended from a common shaft as shown in FIG. 13.

With reference to FIG. 12, shown are a first set of electrodes 303 and a second set of electrodes 304, each set including three separate electrodes, as shown in FIG. 13, which extend down into the passageway between the conveyors 301 and 302 in such a manner that the main part of this passageway is obstructed.

Each of electrodes 303 may be independently operable to pivot about a horizontal shaft 305, and may be biased by spring means 306.

In a similar manner, each of electrodes 304 are independently operable to pivot about a horizontal shaft 307 and are biased by spring means 308.

The bearings of the shafts 305 and 307 and the springs 306 and 308 are affixed to a plate 309, which is in turn affixed to supports 310 mounted on frame 311 (not shown in detail) of the conveyor apparatus. Tubes 312 may form an upper restriction of the conveyor apparatus.

At the lower end thereof, each one of the electrode arms 303 is provided with a small bent electrode contact portion 313 which is connected to a cable 314 provided in the electrode arm.

On the side facing the first electrode, each one of the electrode arms 304 is covered by a conductive contact portion 315 which is connected to a cable 316.

As shown in FIG. 12, the sets of electrodes may be pivoted upward entirely to the horizontal position to enable a stunned animal to pass thereunder. FIG. 6 shows both sets of electrodes in their initial position. An animal arriving from the left-hand side, with respect to the orientation shown in FIG. 12, causes at least one of the arms 303, including the electrodes 313, to pivot upward without causing a substantial change in distance relative to the electrode arms 304 and the electrodes 315. As soon as the animal contacts an electrode 315, the current circuit is closed.

The distance between the sets of electrodes may be adjusted in a direction coinciding with the travel of the conveyor. Furthermore, it is within the contemplation of the present invention to condition application of the jolt of the current on the animal displacing the second electrode over an arc having a length equal to a predetermined angle as opposed to automatically applying the jolt of current at the moment that the animal simultaneously contacts both electrodes.

Figure 5:
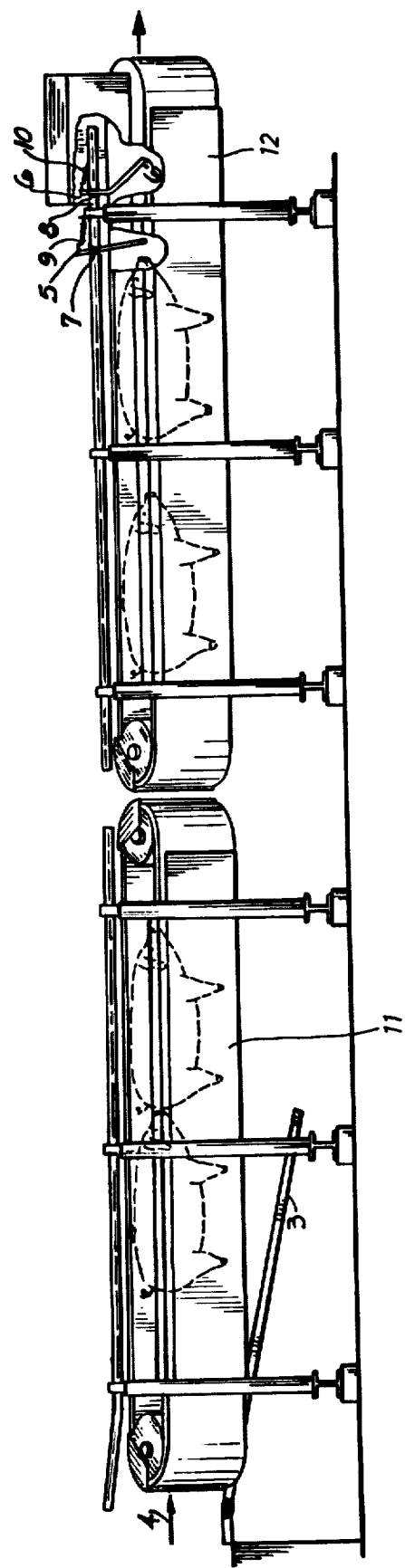
FIG. 5 illustrates a side view of an embodiment of the invention employing two consecutive V-shaped conveyor belts.
Figure 14:
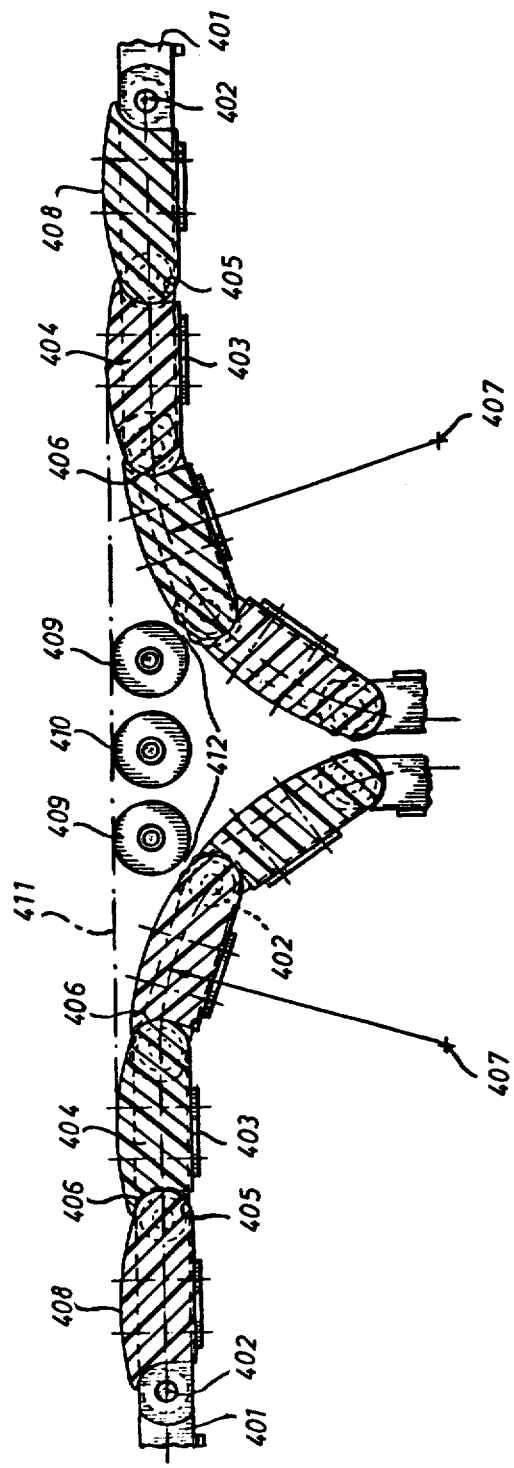
FIG. 14 is a diagrammatic cross-sectional view of portions of two conveyor belts, such as the belts illustrated in FIG. 1.

In order to prevent an animal from getting one of its legs trapped in the transition area between the two restrainers 11 and 12, illustrated in FIG. 5, it is desirable to guide the animal across the transition area. In the present instance this is provided by guide rollers 409 and 410 shown in FIG. 14. FIG. 14 illustrates a cross section of the transition area of two conveyor belts. Preferably, the guide rollers 409 and 410 are positioned so that they are tangential to the plane coincident with the operating surfaces of the consecutive conveying belts. The guide rollers may be freely rotatable or they may be driven at such a velocity that their peripheral velocity is substantially equal to the velocity of the preceding (upstream) conveyor. This latter alternative avoids further conveyance of an animal past the transition area whenever the first conveyor 11 is stopped due to an excess of animals being transported onto the second conveyor 12.

Alternatively, each conveying belt may comprise a plurality of curved conveying plates, as illustrated in FIG. 14.

The conveyor means shown in FIG. 14 includes two chains, i.e, an upper chain and a lower chain, each one of the chains having links 401 and hinge shafts 402. Each one of the links may possess a lip 403 on which a plate 404 is mounted.

Each one of the plates may include front edge 405 having a circular cross section, the circular front edge being concentric with the hinge shaft 402, and a rear edge 406 which has a curvature of about a quarter of a circle and being likewise concentric with the shaft 402.

At the location of the reversing wheel (not shown), the axis of which is indicated at 407, the plates are hinged about each other without a gap being formed between the plates. The plates possess a curved operating surface 408, the radius of curvature of which corresponds to the arc of rotation about the reversing wheel so that the operating surface will run concentrically with the axis 407 at the location of the reversing wheel. The curvature of the surface of the plates promotes the entrainment of the animals.

Figure 15:
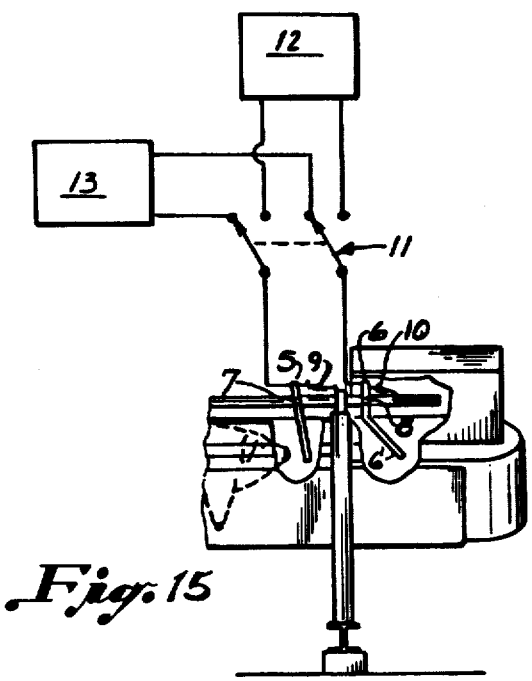
FIG. 15 is a partial schematic diagram of a low power source, a full power source, and a switch.

Referring to FIG. 15 the apparatus of the present invention may also be provided with means 11 for controlling the power supplied to electrodes 5 and 6. The means 11 may comprise a control device 11 that is constructed such that the full power 12 is switched in after a current with a low power 13 has originated from one of the electrodes 6 to the other 5, as shown in FIG. 15. In a presently preferred embodiment, an animal is contacted by both the electrodes substantially at the same time. Thereupon, a sensing current will start to flow, indicating whether the proper resistance is present. As every different kind of animal presents a specific resistance, it is possible to determine when a proper contact has occurred between the animal's head and the electrodes before applying the stunning jolt. When proper contact is established, the full current is switched in, and stunning occurs.

Figure 16:
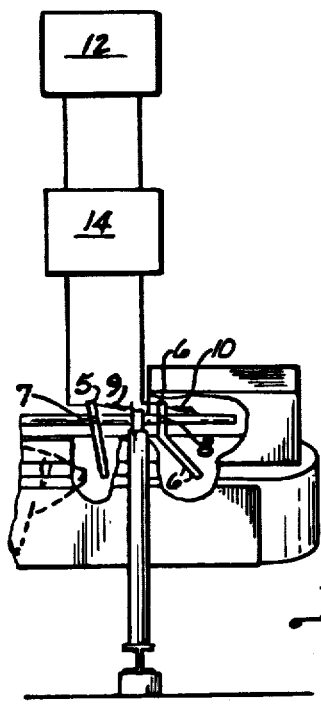
FIG. 16 is a partial schematic diagram of a delay means interposed between the stunning power source and the electrodes.

The apparatus may also include a device for controlling the power supplied to the electrodes 5 and 6 which is constructed such, that after having delivered the full power during a short period, that is, after having delivered a rush of current necessary for one stunning, the device is locked by a time delayed means 14 from delivering a next rush of current during a certain longer period, as shown in FIG. 16. Thus, as is the case where the consecutive electrode arrangement is employed, a next-succeeding animal does not receive a shock too early if it comes in contact with the first electrode while the second electrode is still in contact with the preceding animal. As discussed above, this problem may also be alleviated by utilizing the preferred two conveyor embodiment, which is illustrated in FIG. 1.

In accordance with the present invention, automatic stunning may be attained at a drop out percentage that is lower than that achieved by manual stunning, particularly in manual stunning wherein the electrodes are placed upon the animal's head in a transverse manner. While maintaining a low drop out percentage, a considerably faster production rate of high quality grade meat may be achieved.

It is to be understood that the invention will admit of other embodiments. The description herein of various embodiments of the invention is given only to facilitate understanding of the invention by those skilled in the art, and should not be construed as limiting the invention.

What is claimed is:

1. An apparatus for electrically stunning animals to be butchered, comprising:

a pair of endless conveyor belts, said belts being positioned to form a substantially V-shaped passageway therebetween, said V-shaped passageway being adapted to receive an animal, said belts being operable to run at a first synchronized rate, said belts being adapted to hold the animal fixedly with respect to said belts;

a floor beneath said belts, said floor being inclined downwardly, said floor having a distance between said floor and said belts, said distance between said floor and said belts being generally increasing in the direction of movement of said belts;

a frame, said frame being adapted to support said belts;

a first electrode, said first electrode being supported by said frame, said first electrode being adapted to extend downwardly into said V-shaped passageway;

a second electrode, said second electrode being supported by said frame, said second electrode being electrically isolated from said frame, said second electrode being adapted to extend downwardly into said V-shaped passageway, said first and second electrodes being adapted to automatically engage the head of an animal supported between the belts, said first and second electrodes being adapted to permit the transmission of stunning current to the animal when said first and second electrodes simultaneously engage said animal;

the first and second electrodes being arranged side by side in the V-shaped passageway and being formed as mirror images of each other, the first and second electrodes having outer edges substantially parallel to and near to the conveyor belts to minimize the chances of an animal putting its head into the gap between an electrode and a belt, the first and second electrodes having curved inner surfaces which diverge from each other and then converge toward each other to form an opening through which an animal may place its head, thereby unintentionally seeking to place its head into a position for favorable electrical contact between the electrodes and the animal's head; and, said belts, said floor, said frame, said first electrode and said second electrode being mutually cooperable to permit automatic stunning of the animal by moving the animal into engagement with said first and second electrodes while maintaining the animal in separate relation to other animals to be stunned and while preventing the animals from moving with respect to each other after the animals are received by said belts.

2. An apparatus for electrically stunning animals to be butchered, comprising:

a pair of endless conveyor belts, said belts being positioned to form a substantially V-shaped passageway therebetween, said V-shaped passageway being adapted to receive an animal, said belts being operable to run at a first synchronized rate, said belts being adapted to hold the animal fixedly with respect to said belts;

a floor beneath said belts, said floor being inclined downwardly, said floor having a distance between said floor and said belts, said distance between said floor and said belts being generally increasing in the direction of movement of said belts;

a frame, said frame being adapted to support said belts;

a first rigid electrode, said first electrode being supported by said frame, said first electrode being adapted to extend downwardly into said V-shaped passageway;

a second rigid electrode, said second electrode being supported by said frame, said second electrode being electrically isolated from said frame, said second electrode being adapted to extend downwardly into said V-shaped passageway, said first and second electrodes being adapted to automatically engage the head of an animal supported between the belts, said first and second electrodes being adapted to permit the transmission of stunning current to the animal when said first and second electrodes simultaneously engage said animal;

said first electrode and said second electrode being positioned side by side in said V-shaped passageway, said first electrode having an outer edge positioned near one of said belts, said second electrode having an outer edge positioned near the other one of said belts, the first electrode and the second electrode having inner edges which define an opening in said V-shaped passageway through which an animal may place its snout; and, said belts, said floor, said frame, said first electrode and said second electrode being mutually cooperable to permit automatic stunning of the animal by moving the animal into engagement with said first and second electrodes while maintaining the animal in separate relation to other animals to be stunned and while preventing the animals from moving with respect to each other after the animals are received by said belts.

3. An apparatus for electrically stunning animals to be butchered, comprising:

a pair of endless conveyor belts, said belts being positioned to form a substantially V-shaped passageway therebetween, said V-shaped passageway being adapted to receive an animal, said belts being operable to run at a first synchronized rate, said belts being adapted to hold the animal fixedly with respect to said belts;

a floor beneath said belts, said floor being inclined downwardly, said floor having a distance between said floor and said belts, said distance between said floor and said belts being generally increasing in the direction of movement of said belts;

a frame, said frame being adapted to support said belts;

a first set of electrodes, said first set of electrodes comprising a first pair of substantially parallel rods, the first pair of parallel rods being adapted to extend downwardly into said V-shaped passageway, the first pair of parallel rods being spaced apart transversely in said V-shaped passageway a sufficient distance to allow the animal's head to pass therebetween, one of the rods being located sufficiently close to one of the endless conveyor belts to inhibit an animal from attempting to place its head between the rod and the belt, the other of the rods being located sufficiently close to the other of the endless conveyor belts to inhibit an animal from attempting to place its head between the rod and the belt, the first pair of parallel rods being supported by said frame, the first set of electrodes being adapted to engage the head of an animal;

a second set of electrodes, said second set of electrodes comprising a second pair of substantially parallel rods, the second pair of parallel rods being adapted to extend downwardly into said V-shaped passageway, the second pair of parallel rods being spaced a distance from said first set of electrodes in the direction of movement of said belts, the second pair of parallel rods being spaced apart transversely in said V-shaped passageway a distance substantially equal to the distance between an animal's eyes, the second set of electrodes being adapted to engage an animal's head near its eyes, the second set of electrodes being supported by said frame;

said first and second sets of electrodes being adapted to permit the transmission of stunning current to the animal when said first and second electrodes simultaneously engage said animal; and, said belts, said floor, said frame, said first set of electrodes, and said second set of electrodes being mutually cooperable to permit automatic stunning of the animal by moving the animal into engagement with said first and second electrodes while maintaining the animal in separate relation to other animals to be stunned and while preventing the animals from moving with respect to each other after the animals are received by said belts.

4. The apparatus according to claim 2, wherein:
said frame further comprises a plurality of horizontal shafts;
said first electrode is pivotally connected to one of said shafts; and
said second electrode is pivotally connected to one of said shafts.

5. The apparatus according to claim 2 or 4, further comprising:
a first spring, said first spring being connected between said frame and said first electrode, said first spring being adapted to maintain said first electrode in an initial position between said belts; and,
a second spring, said second spring being connected between said frame and said second electrode, said second spring being adapted to maintain said second electrode in an initial position between said belts.

6. The apparatus according to claim 3, wherein:
said first set of electrodes is maintained initially in a vertical position; and,
said second set of electrodes is maintained initially in a generally downwardly sloping position, wherein said second set of electrodes slopes generally downwardly and away from said first set of electrodes.

7. The apparatus according to claim 2 or 4, further comprising in combination:
a power supply control, said control being adapted to switch a full amount of power to said first and second electrodes after a current at a lower power level has flowed for a predetermined period of time between said first and second electrodes.

8. The apparatus according to claim 2 or 4, further comprising:
a second pair of endless conveyor belts, said second belts being positioned after said first pair of belts, said second pair of belts being positioned to form a V-shaped passageway therebetween, said second belts being operable to run at a second synchronized rate, said second synchronized rate being faster than said first synchronized rate; and,
wherein said first and second electrodes are located proximately to said second belts so that the electrodes contact the animals while the animals are being held in the second belts;
said floor, said first belts and said second belts being mutually cooperable to ensure an adequate separation of animals moving through the apparatus; and,
said floor, said first belts and said second belts being mutually cooperable with said first and second electrodes to permit automatic stunning of the animals without stopping said first and second belts from running.

9. The apparatus according to claim 5, further comprising:
a second pair of endless conveyor belts, said second belts being positioned to precede said first pair of belts, said second pair of belts being positioned to form a V-shaped passageway therebetween, said second belts being operable to run at a second synchronized rate, said second synchronized rate being lower than said first synchronized rate; and,
wherein said first and second electrodes are located proximately to said second belts so that the electrodes contact the animals while the animals are being held in second belts;
said floor, said first belts and said second belts being mutually cooperable to ensure an adequate separation of animals moving through the apparatus; and
said floor, said first belts and said second belts being mutually cooperable with said first and second electrodes to permit automatic stunning of the animals without stopping said first and second belts from running.

10. The apparatus according to claim 6, further comprising:
a second pair of endless conveyor belts, said second belts being positioned after said first pair of belts, said second pair of belts being positioned to form a V-shaped passageway therebetween, said second belts being operable to run at a second synchronized rate being faster than said first synchronized rate; and,
wherein said first and second sets of electrodes are located proximately to said second belts so that the electrodes contact the animals while the animals are being held in the second belts;
said floor, said first belts and said second belts being mutually cooperable to ensure an adequate separation of animals moving through the apparatus; and,
said floor, said first belts and said second belts being mutually cooperable with said first and second set of electrodes to permit automatic stunning of the animals without stopping said first and second belts from running.

11. The apparatus according to claim 7, further comprising:

a second pair of endless conveyor belts, said second belts being positioned after said first pair of belts, said second pair of belts being positioned to form a V-shaped passageway therebetween, said second belts being operable to run at a second synchronized rate, said second synchronized rate being lower than said first synchronized rate; and, wherein said first and second electrodes are located proximately to said second belts so that the electrodes contact the animals while the animals are being held in second belts;

said floor, said first belts and said second belts being mutually cooperable to ensure an adequate separation of animals moving through the apparatus; and said floor, said first belts and said second belts being mutually cooperable with said first and second electrodes to permit automatic stunning of the animals without stopping said first and second belts from running.

12. The apparatus according to claim 3, wherein:
said first set of electrodes is maintained initially in a vertical position;

said second set of electrodes is maintained initially in a generally downwardly sloping position, said second set of electrodes being generally sloped downwardly and generally in the direction of movement of said belts; and, said first and second sets of electrodes being mutually cooperable to automatically permit the transmission of a stunning current generally through the brain of the animal, said first set of electrodes being alignable in contact with the backside of the head of the animal when said second set of electrodes contacts the animal generally in the region of the face of the animal.

13. The apparatus according to claim 2, further comprising:
time delay means electrically interposed between said electrodes and a source of stunning current for electrically disconnecting said electrodes from said source for a predetermined period of time after the animal is stunned.

14. An automatic stunning apparatus, comprising:
a first restrainer formed by a pair of conveyor belts, the pair of belts being positioned to form a first substantially V-shaped passageway therebetween, the first restrainer being adapted to receive an animal and to move the animal at a first rate of speed;

a second restrainer formed by a pair of conveyor belts, the pair of belts being positioned to form a second substantially V-shaped passageway therebetween, the second V-shaped passageway being generally aligned with the first V-shaped passageway, the second restrainer being positioned next to the first restrainer so that animals conveyed by the first restrainer are automatically transferred to the second restrainer, the second restrainer being adapted to receive an animal from the first restrainer and to move the animal at a second rate of speed faster than the first rate of speed, thereby automatically separating animals from each other while such animals are being conveyed by the second restrainer;

a pair of electrodes pivotally suspended from a reciprocating support, the reciprocating support being located so that the electrodes contact an animal while the animal is being held in the second restrainer, the reciprocating support having an initial position, the reciprocating support being adapted to move in the direction of conveyance when an animal contacts the electrodes at a velocity substantially equal to the second rate of speed of the second restrainer to maintain the electrodes in contact with the animal as the animal is moved by the second restrainer, the reciprocating support being adapted to return to its initial position after the animal has been stunned to position the electrodes for another animal;

a sensor to detect when an animal has contacted the electrodes; and, the pair of electrodes being positioned so that the electrodes extend downwardly into the second V-shaped passageway, the electrodes being positioned side-by-side in a plane that is generally perpendicular to the direction of conveyance, the electrodes being formed in a mirror image of each other, the electrodes having an outer edge substantially parallel to the conveyor belts of the second restrainer to minimize the chances of an animal putting its head into the gap between an electrode and a conveyor belt, the electrodes having inner curved surfaces with edges which first diverge from each other and then converge toward each other, the curved inner surfaces being shaped to present an opening through which an animal may seek to put its snout and thereby unintentionally position its head in a position so that a favorable electric current path may be established between the pair of electrodes through the head of the animal.

15. The automatic stunning apparatus of claim 14, further comprising:
a spring attached to at least one of the pivotally suspended electrodes, the electrodes being adapted to swing away from an initial position to allow an animal to pass by the electrodes after it has been stunned, the spring being adapted to urge the electrode toward its initial position; and, a dampening member connected to said electrode to dampen movement of the electrode in order to improve electrical contact between the electrode and the animal.

* * * * *

UNITED STATES PATENT AND TRADEMARK OFFICE
CERTIFICATE OF CORRECTION

PATENT NO. : 4,468,837
DATED : September 4, 1984
INVENTOR(S) : Johan W. Nijhuis

It is certified that error appears in the above-identified patent and that said Letters Patent is hereby corrected as shown below:

Column 1, last line, change "pheres" to -- peres --.

Column 2, line 1, change "ampheres" to -- amperes --; line 4, change "ampheres" to -- amperes --; line 44, change "of P.S.E." to -- or P.S.E. --.

Column 5, line 21, change "a 4" to -- as 4 --.

Claim 9, line 4, change "to precede" to -- after --; line 9, change "lower" to -- faster"; line 13, after "held in", insert -- the --.

Claim 10, line 8, change "rate" to -- rate, said second synchronized rate --; line 18, change "set" to -- sets --.

Claim 11, line 9, change "lower" to -- faster --.

Signed and Sealed this

Nineteenth Day of March 1985

[SEAL]

Attest:

DONALD J. QUIGG

Attesting Officer     Acting Commissioner of Patents and Trademarks